US012699616B2

(12) United States Patent
Tahvili et al.

(10) Patent No.: US 12,699,616 B2
(45) Date of Patent: Aug. 4, 2026

(54) METHODS AND APPARATUSES FOR TROUBLESHOOTING A COMPUTER SYSTEM

(71) Applicant: Telefonaktiebolaget LM Ericsson (publ), Stockholm (SE)

(72) Inventors: Sahar Tahvili, Solna (SE); Martin Sköld, Järfälla (SE); Raghotham Sripadraj, Bangalore (IN); Hamidreza Moradmand, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 10 days.

(21) Appl. No.: 18/256,708

(22) PCT Filed: Dec. 11, 2020

(86) PCT No.: PCT/EP2020/085850
§ 371 (c)(1),
(2) Date: Jun. 9, 2023

(87) PCT Pub. No.: WO2022/122174
PCT Pub. Date: Jun. 16, 2022

(65) Prior Publication Data
US 2024/0045752 A1 Feb. 8, 2024

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0781* (2013.01);
(Continued)

(58) Field of Classification Search
CPC .............. G06F 11/079; G06F 11/0709; G06F 11/0781; G06F 11/0793; G06F 11/3688
See application file for complete search history.

(56) References Cited

U.S. PATENT DOCUMENTS 7,849,363 B2 12/2010 Mochizuki et al.
9,229,800 B2 1/2016 Jain et al.
(Continued)

FOREIGN PATENT DOCUMENTS

CN 107341068 A 11/2017
WO 2015129879 A1 9/2015
WO 2019197933 A1 10/2019

OTHER PUBLICATIONS

International Search Report and Written Opinion of the International Searching Authority, PCT/EP2020/085850, mailed Sep. 9, 2021, 20 pages.
(Continued)

*Primary Examiner* — Katherine Lin
(74) *Attorney, Agent, or Firm* — Sage Patent Group

(57) ABSTRACT

A method and apparatus of troubleshooting a computer system are disclosed. The method comprises obtaining a list that comprises one or more events textually describing an activity of the computer system being tested; selecting a group of events in the list, wherein the group of events is indicative of a failed test of the computer system; extracting textual features from the selected group of events; generating a feature vector comprising the extracted textual features; mapping the feature vector to a plurality of predefined troubleshooting activities; selecting one or more of the plurality of predefined troubleshooting activities for execution in response to the mapping of the feature vector.

20 Claims, 14 Drawing Sheets

(51) Int. Cl.

| | |
|---|---|
| *G06F 11/3668* | (2025.01) |
| *G06F 40/279* | (2020.01) |
| *G06F 40/30* | (2020.01) |

(52) U.S. Cl.
CPC ...... *G06F 11/0793* (2013.01); *G06F 11/3688* (2013.01); *G06F 40/279* (2020.01); *G06F 40/30* (2020.01)

(56) References Cited

U.S. PATENT DOCUMENTS

| | | | |
|---|---|---|---|
| 9,753,800 | B1 | 9/2017 | Jadunandan et al. |
| 9,984,329 | B2 | 5/2018 | Winnick |
| 10,678,669 | B2 | 6/2020 | Debnath et al. |
| 2015/0227838 | A1 | 8/2015 | Wang et al. |
| 2018/0285750 | A1 | 10/2018 | Purushothaman et al. |
| 2019/0324831 | A1* | 10/2019 | Gu ..................... G06F 11/0775 |
| 2019/0340512 | A1 | 11/2019 | Vidal et al. |

OTHER PUBLICATIONS

C. Mccormick, "BERT Word Embeddings Tutorial", May 14, 2019, (XP055833931) pp. 1-20.

K. KC et al., "ELT: Efficient Log-based Troubleshooting System for Cloud Computing Infrastructures", 2011 IEEE 30th International Symposium on Reliable Distributed Systems, 2011, pp. 11-20.

K. Ochiai et al., "Real-time On-Device Troubleshooting Recommendation for Smartphones", Porceedings of the 25th ACM SIGKDD International Conference on Knowledge Discovery and Data Mining, Jul. 25, 2019, (XP058466320) pp. 2783-2791, ACM Press, New York, NY, USA.

Q. Lin et al., "Log Clustering based Problem Identification for Online Service Systems", 2016 IEEE/ACM 38th IEEE International Conference on Software Engineering Companion, May 14, 2016, (XP058258026) pp. 102-111.

R. Cotterell et al., "Morphological Word Embeddings", arXiv.org, Jul. 4, 2019, (XP055833954) pp. 1-6, No. arXiv:1907.02423v1.

S. Cai et al., "Clustering analysis of process alarms using word embedding", Journal of Process Control, 2019, pp. 11-19, vol. 83.

V. Sanh et al., "DistilBERT, a distilled version of BERT: smaller, faster, cheaper and lighter", arXiv, Mar. 1, 2020.

W. Jiang et al., "Understanding Customer Problem Troubleshooting from Storage System Logs", 7th USENIX Conference on File and Storage Technologies, Feb. 24-27, 2009, pp. 43-56.

Y. Li et al., "Learning Word Representations for Sentiment Analysis", Cognitive Computation 9, 2017, pp. 843-851.

* cited by examiner

Events list
102

100

Selecting a group of events
104

Extracting textual features
106

Generating a feature vector
108

Mapping the feature vector to predefined
troubleshooting activities
110

Selecting one or more predefined troubleshooting
activities for execution
112

FIG. 5

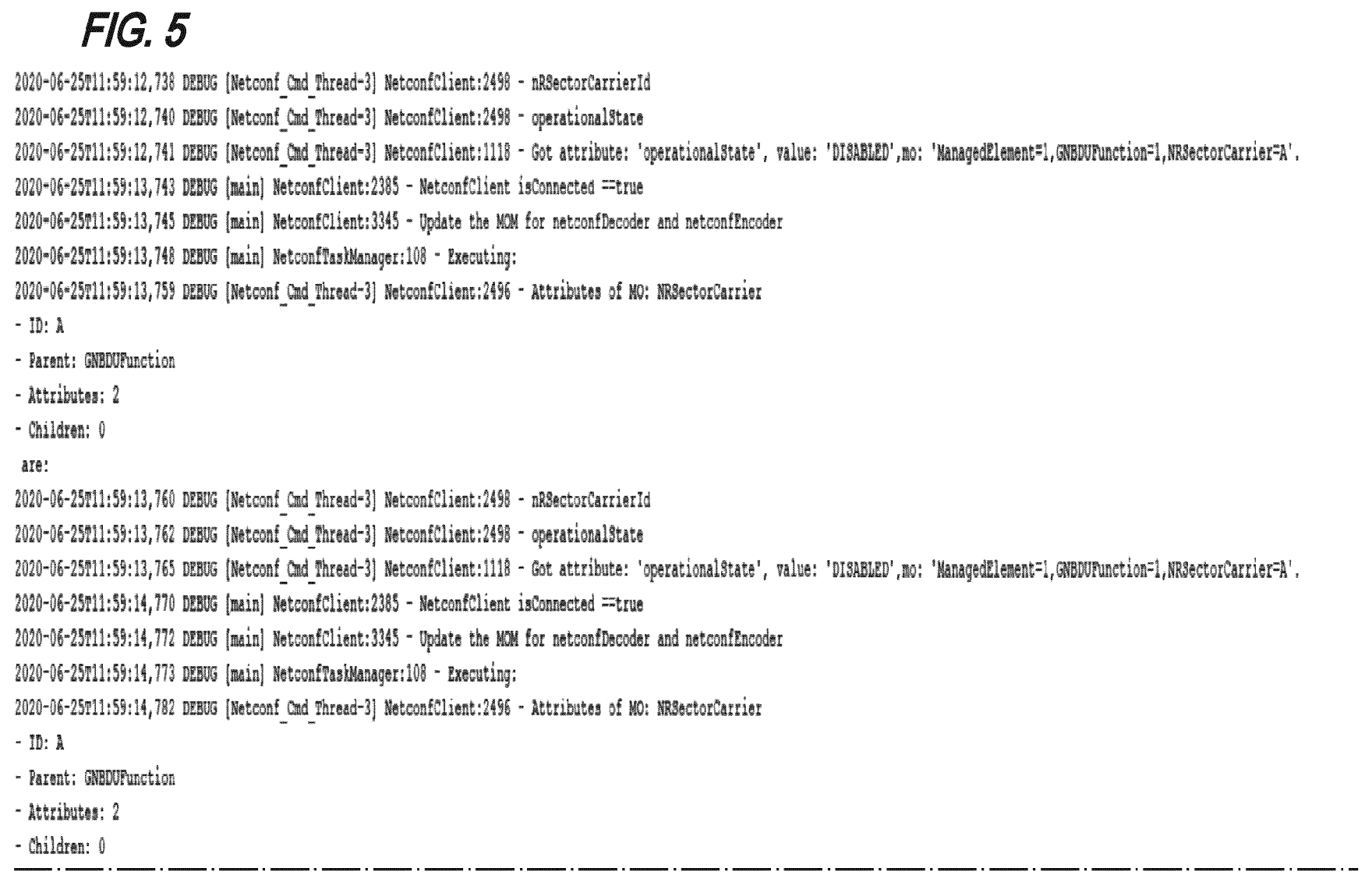

```
2020-06-25T11:59:12,738 DEBUG [Netconf_Cmd_Thread-3] NetconfClient:2498 - nRSectorCarrierId
2020-06-25T11:59:12,740 DEBUG [Netconf_Cmd_Thread-3] NetconfClient:2498 - operationalState
2020-06-25T11:59:12,741 DEBUG [Netconf_Cmd_Thread-3] NetconfClient:1118 - Got attribute: 'operationalState', value: 'DISABLED', mo: 'ManagedElement=1,GNBDUFunction=1,NRSectorCarrier=A'.
2020-06-25T11:59:13,743 DEBUG [main] NetconfClient:2385 - NetconfClient isConnected =true
2020-06-25T11:59:13,744 DEBUG [main] NetconfClient:3345 - Update the MOM for netconfDecoder and netconfEncoder
2020-06-25T11:59:13,748 DEBUG [main] NetconfTaskManager:108 - Executing:
2020-06-25T11:59:13,759 DEBUG [Netconf_Cmd_Thread-3] NetconfClient:2496 - Attributes of MO: NRSectorCarrier
are:
- ID: A
- Parent: GNBDUFunction
- Attributes: 2
- Children: 0

2020-06-25T11:59:13,760 DEBUG [Netconf_Cmd_Thread-3] NetconfClient:2498 - nRSectorCarrierId
2020-06-25T11:59:13,762 DEBUG [Netconf_Cmd_Thread-3] NetconfClient:2498 - operationalState
2020-06-25T11:59:13,765 DEBUG [Netconf_Cmd_Thread-3] NetconfClient:1118 - Got attribute: 'operationalState', value: 'DISABLED', mo: 'ManagedElement=1,GNBDUFunction=1,NRSectorCarrier=A'.
2020-06-25T11:59:14,770 DEBUG [main] NetconfClient:2385 - NetconfClient isConnected =true
2020-06-25T11:59:14,772 DEBUG [main] NetconfClient:3345 - Update the MOM for netconfDecoder and netconfEncoder
2020-06-25T11:59:14,773 DEBUG [main] NetconfTaskManager:108 - Executing:
2020-06-25T11:59:14,782 DEBUG [Netconf_Cmd_Thread-3] NetconfClient:2496 - Attributes of MO: NRSectorCarrier
- ID: A
- Parent: GNBDUFunction
- Attributes: 2
- Children: 0
```

*FIG. 5 (Cont.)*

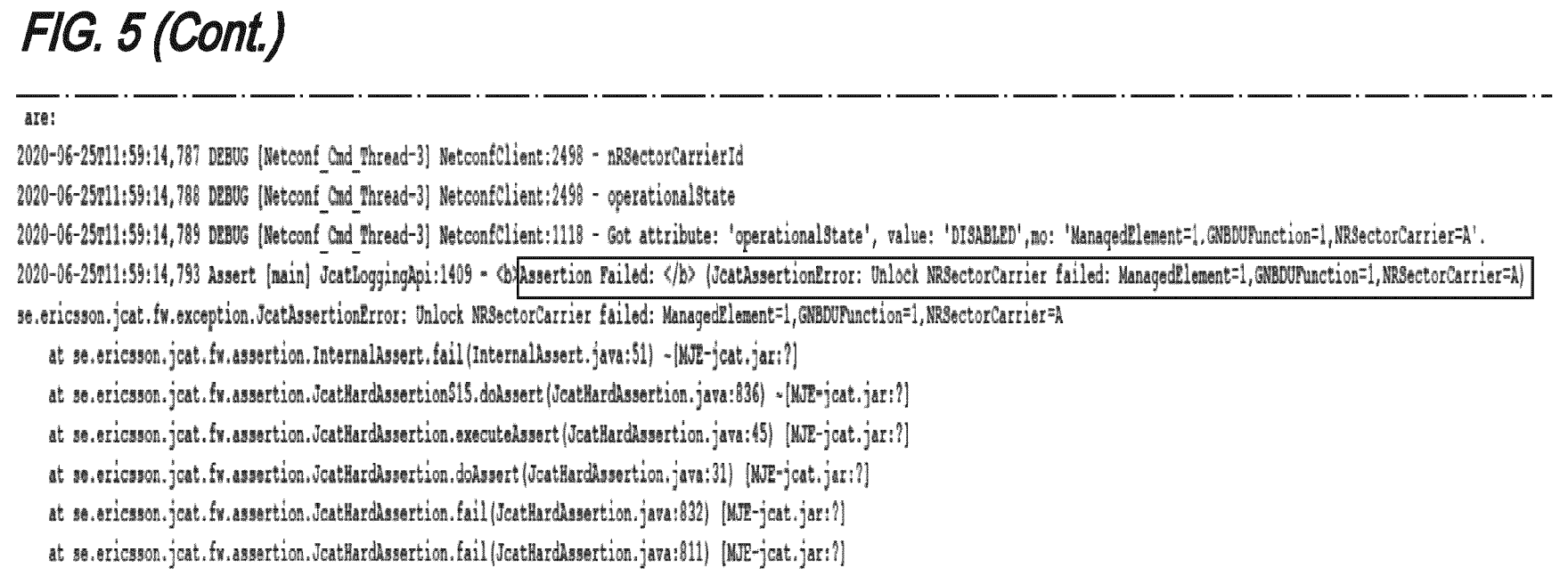

```
are:
2020-06-25T11:59:14,787 DEBUG [Netconf_Cmd_Thread-3] NetconfClient:2498 - nRSectorCarrierId
2020-06-25T11:59:14,788 DEBUG [Netconf_Cmd_Thread-3] NetconfClient:2498 - operationalState
2020-06-25T11:59:14,788 DEBUG [Netconf_Cmd_Thread-3] NetconfClient:1118 - Got attribute: 'operationalState', value: 'DISABLED', mo: 'ManagedElement=1,GNBDUFunction=1,NRSectorCarrier=A'.
2020-06-25T11:59:14,789 Assert [main] JcatLoggingApi:1409 - <b>Assertion Failed: </b> (JcatAssertionError failed: Unlock NRSectorCarrier failed: ManagedElement=1,GNBDUFunction=1,NRSectorCarrier=A)

se.ericsson.jcat.fw.exception.JcatAssertionError: Unlock NRSectorCarrier failed: ManagedElement=1,GNBDUFunction=1,NRSectorCarrier=A at se.ericsson.jcat.fw.assertion.internalAssert.fail(internalAssert.java:51) - [NJE-jcat.jar:?]
    at se.ericsson.jcat.fw.assertion.JcatHardAssertion515.doAssert(JcatHardAssertion.java:836) - [NJE-jcat.jar:?]
    at se.ericsson.jcat.fw.assertion.JcatHardAssertion.executeAssert(JcatHardAssertion.java:45) [NJE-jcat.jar:?]
    at se.ericsson.jcat.fw.assertion.JcatHardAssertion.doAssert(JcatHardAssertion.java:31) [NJE-jcat.jar:?]
    at se.ericsson.jcat.fw.assertion.JcatHardAssertion.fail(JcatHardAssertion.java:832) [NJE-jcat.jar:?]
    at se.ericsson.jcat.fw.assertion.JcatHardAssertion.fail(JcatHardAssertion.java:811) [NJE-jcat.jar:?]
```

*FIG. 6 (Cont.)*

```
6289 1 xxdate INFO StepImpl xxdigit – test step xxdigit_1] end Execute node : LI_NG_BPU_sellitbs00849 , type : gnb – xxdigit xxdigit xxdigit
2 xxdate INFO JcatLoggingApi xxdigit – Sub Test step xxdigit_2] begin Execute node : sellitastp00115_fsue_nr_higher , type : dnurp
3 xxdate DEBUG AbstractCli xxdigit – Connecting cli
4 xxdate DEBUG ImplSsh xxdigit – Creating a ssh connection
5 xxdate DEBUG ImplSsh xxdigit – Done creating a ssh connection
6 xxdate DEBUG ImplSsh xxdigit – Available authentication methods: [keyboard-interactive, password]
7 xxdate DEBUG ImplSsh xxdigit – Trying to authenticate with method: keyboard-interactive
8 xxdate DEBUG ImplSsh xxdigit – keyboard-interactive authentication successful? false
9 xxdate DEBUG ImplSsh xxdigit – Reconnecting ssh connection
10 xxdate DEBUG ImplSsh xxdigit – Disconnecting ssh connection
11 xxdate DEBUG ImplSsh xxdigit – Done disconnecting ssh connection
12 xxdate DEBUG ImplSsh xxdigit – Creating a ssh connection
13 xxdate DEBUG ImplSsh xxdigit – Done creating a ssh connection
14 xxdate DEBUG ImplSsh xxdigit – Done reconnecting ssh connection
15 xxdate DEBUG ImplSsh xxdigit – Trying to authenticate with method: password
16 xxdate DEBUG ImplSsh xxdigit – password authentication successful? true
17 xxdate DEBUG ImplSsh xxdigit – Authentication Complete
18 xxdate DEBUG ImplSsh xxdigit – Opening a ssh session
19 xxdate DEBUG ImplSsh xxdigit – Done opening a ssh session
20 xxdate DEBUG ImplSsh xxdigit – Request pty: dumb with size: [WidthCharacters=300, HeightCharacters=24, WidthPixels=640, HeightPixels=480]
21 xxdate DEBUG ImplSsh xxdigit – Starting shell session
22 xxdate DEBUG ImplSsh xxdigit – Done starting shell session
23 xxdate DEBUG AbstractCli xxdigit – Login message: xxnl This is an interface for troubleshooting. Using the commands available xxnl through this interface can impact system performance. No actions x
24 xxdate DEBUG AbstractCli xxdigit – Done connecting cli
25 xxdate INFO DecoratorLoggingofCommandsSent xxdigit – -> xxvar
26 xxdate DEBUG AbstractCli xxdigit – Sending command: /diagm/mtd @tsue debug -ta l2_sc -fun DLRLCNRPE_ELEMENTREACTOR_resetElementStats() -dest RTS_WAIT
27 xxdate DEBUG StringBuilderUtil xxdigit – Didn't find a command echo to remove from output xxvar
28 xxdate DEBUG StringBuilderUtil xxdigit – Removing prompt from output, Removing: coil [/].>
29 xxdate DEBUG DecoratorLoggingOfCommandResults xxdigit – <= xxvar
30 xxdate INFO DecoratorLoggingOfCommandSent xxdigit – => xxvar
31 xxdate DEBUG AbstractCli xxdigit – Sending command: /diagm/mtd @tsue debug -ta l2_sc -fun ULRLCNRPE_ELEMENTREACTOR_resetElementStats() -dest RTS_WAIT
32 xxdate DEBUG StringBuilderUtil xxdigit – Didn't find a command echo to remove from output xxvar
```

32b

SP894_cnurpRandomAccessDnurpRestart.log [50,6289] [55% of 11406]

```
sample_log = inference_train_data_df.log_event.values.tolist()[0]

sample_log

'xxdate Assert [main] JcatLoggingApi xxdigit - <b>Assertion Failed: </b>Failed to enable the Enb cell (JcatAssertionE
rror: Failed to enable the Enb cell : expected [true] but found [false]) xxnl se.ericsson.jcat.fw.exception.JcatAsser
tionError: Failed to enable the Enb cell : expected [true] but found [false] xxstacktrace xxdate DEBUG NetconfClient
xxdigit - Got attribute: xxvar, value: xxvar,mo: xxvar. xxdate DEBUG NetconfClient xxdigit - operationalState xxdate
DEBUG NetconfClient xxdigit - eUtranCellFDDId xxdate DEBUG NetconfClient xxdigit - Attributes of MO: EUtranCellFDD xx
nl - ID xxdigit xxnl - Parent: ENodeBFunction xxnl - Attributes xxdigit xxnl - Children xxdigit xxnl  are:  xxdate DE
BUG NetconfTaskManager xxdigit - Executing: '
```

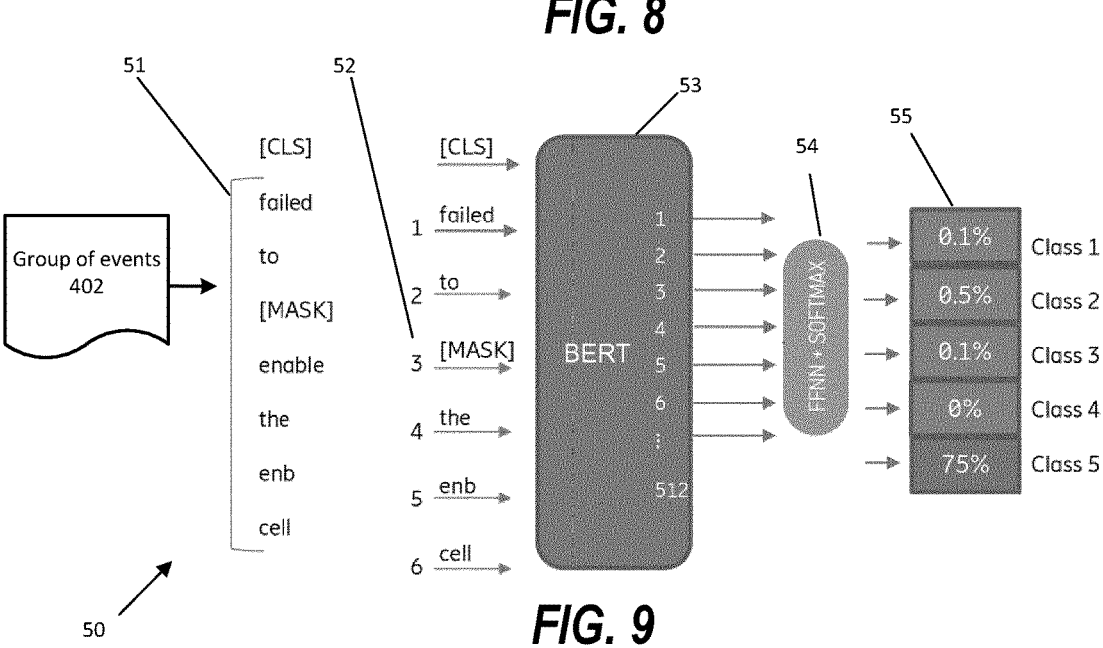

FIG. 9

```
tokenizer(sample_log,  padding=True, max_length=1000)

{'input_ids': [101, 22038, 13701, 20865, 1031, 2364, 1033, 29175, 4017, 21197, 4726, 9331, 2072, 22038, 4305, 23806,
1011, 1026, 1038, 1028, 23617, 3478, 1024, 1026, 1013, 1038, 1028, 3478, 2000, 9585, 1996, 4372, 2497, 3526, 1006, 29
175, 6790, 18116, 3508, 2121, 29165, 1024, 3478, 2000, 9585, 1996, 4372, 2497, 3526, 1024, 3517, 1031, 2995, 1033, 20
21, 2179, 1031, 6270, 1033, 1007, 22038, 20554, 7367, 1012, 4388, 7092, 1012, 29175, 4017, 1012, 1042, 2860, 1012, 64
53, 1012, 29175, 6790, 18116, 3508, 2121, 29165, 1024, 3478, 2000, 9585, 1996, 4372, 2497, 3526, 1024, 3517, 1031, 29
95, 1033, 2021, 2179, 1031, 6270, 1033, 22038, 9153, 3600, 6494, 3401, 22038, 13701, 2139, 8569, 2290, 5658, 8663, 11
329, 8751, 3372, 22038, 4305, 23806, 1011, 2288, 17961, 1024, 22038, 10755, 1010, 3643, 1024, 22038, 10755, 1010, 958
7, 1024, 22038, 10755, 1012, 22038, 13701, 2139, 8569, 2290, 5658, 8663, 11329, 8751, 3372, 22038, 4305, 23806, 1011,
6515, 9153, 2618, 22038, 13701, 2139, 8569, 2290, 5658, 8663, 11329, 8751, 3372, 22038, 4305, 23806, 1011, 7327, 649
4, 5897, 3363, 2546, 14141, 3593, 22038, 13701, 2139, 8569, 2290, 5658, 8663, 11329, 8751, 3372, 22038, 4305, 23806,
1011, 12332, 1997, 9587, 1024, 7327, 6494, 5897, 3363, 2546, 14141, 22038, 20554, 1011, 8909, 22038, 4305, 23806, 220
38, 20554, 1011, 6687, 1024, 4372, 10244, 29292, 4609, 7542, 22038, 20554, 1011, 12332, 22038, 4305, 23806, 22038, 20
554, 1011, 2336, 22038, 4305, 23806, 22038, 20554, 2024, 1024, 22038, 13701, 2139, 8569, 2290, 5658, 8663, 6199, 1989
5, 24805, 4590, 22038, 4305, 23806, 1011, 23448, 1024, 102], 'attention_mask': [1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1,
1, 1, 1]}
```

METHODS AND APPARATUSES FOR TROUBLESHOOTING A COMPUTER SYSTEM

CROSS REFERENCE TO RELATED APPLICATIONS

This application is a 35 U.S.C. § 371 national stage application of PCT International Application No. PCT/EP2020/085850 filed on Dec. 11, 2020, the disclosure and content of which is incorporated by reference herein in its entirety.

TECHNICAL FIELD

The present disclosure relates to computing systems, and in particular, to apparatuses and methods for troubleshooting computing systems such as network nodes.

BACKGROUND

A simplified wireless communication system 20 is illustrated in FIG. 1. The system 20 includes a user equipment, UE 10 that communicates with one or more access nodes 21, 22 using radio connections comprising component carriers 17P, 17S, 18. The access nodes 21, 22 are connected to a core network node 16. The access nodes 21-22 are part of a radio access network 15. As shown in FIG. 1, a UE 10 can be configured via carrier aggregation to communicate over multiple component carriers 17P, 17S to/from a single access node 21.

Communication systems, such as the wireless communication system 20 shown in FIG. 1, operate using computerized networks and devices that execute complex software to control every aspect of their operation. In that regard, software testing plays a crucial role in software engineering for communication systems. Software testing helps to ensure the reliability and quality of a software system which directly affects the quality of the end product and, ultimately, the quality of the experience of users of the communication system.

Software testing involves designing, creating, and executing appropriate test cases that aim to achieve verification and validation of a system under test. Usually to be able to perform testing, a large number of test cases are required where each test case needs to be executed and passed successfully. After each test execution, a log file will be generated, which may come in different formats, such as JavaScript Object Notation, JSON, or JUnit Common Auto Tester, JCAT.

Test execution result can be categorized into one the following categories: "Pass", "Fail", or "Unstable". The test for which the result is "Fail" may have the following causes:

TABLE 1

| | List of example causes of failed tests. |
|---|---|
| 1 | testing environment is not ready for test execution |
| 2 | mismatch between test cases and the requirements |
| 3 | strong interdependencies between test cases |
| 4 | errors in the code |
| 5 | bug in the system under test. |

Regardless of the reason for failure, a failed test case needs to undergo a troubleshooting process. Traditionally, the log analysis process is performed manually, which means a test engineer, or a troubleshooter reads a log file and uses their knowledge to perform root cause analysis to find a suitable troubleshooting activity which aims to resolve the identified issue. In some cases, a reason for failure can be addressed easily, for example by executing test cases based on their dependencies.

U.S. Pat. No. 9,984,329B2 discloses systems and methods for the automated troubleshooting of problems common to consumer goods and services.

U.S. Pat. No. 9,753,800B1 discloses a communication network operation center (NOC) management system that integrates information about all network elements to one place so that previous occurrences such as trouble case histories, software/hardware/firmware version identities, customer complaints, vendor instructions and procedures, relationships with other network elements, and participation history with the network element can be found with one search from a single tool interface.

SUMMARY

One of the major challenges of testing computing systems involving software is that it is a costly resource-and time-consuming process. It is common that testers need to spend a large part of their time on the root cause analysis and troubleshooting, for example by designing a new test case to replace a failed test case. Therefore, the troubleshooting is also heavily dependent on human work and prone to errors in judgment. Furthermore, reading and analyzing the log files requires extensive technical knowledge of the domain and of different levels of a testing process, such as test design, test implementation, and test execution.

It is therefore an object of the present invention to overcome one or more or the issues identified above.

In accordance with a first aspect of the present invention, there is provided a method of troubleshooting a computer system. The method comprises obtaining a list that comprises one or more events textually describing an activity of the computer system being tested. The method further comprises selecting a group of events in the list, wherein the group of events is indicative of a failed test of the computer system. The method further comprises extracting textual features from the selected group of events. generating (108) a feature vector comprising the extracted textual features. The method further comprises mapping the feature vector to a plurality of predefined troubleshooting activities. The method further comprises selecting one or more of the plurality of predefined troubleshooting activities for execution in response to the mapping of the feature vector.

In accordance with a second aspect of the present invention, there is provided a computer program product comprising a computer readable medium, the computer readable medium having computer readable code embodied therein, the computer readable code being configured such that, on execution by a suitable computer or processor, the computer or processor is caused to perform a method of the first aspect.

In accordance with a third aspect of the present invention, there is provided an apparatus for troubleshooting a computer system. The apparatus comprises a processor circuit and a memory coupled to the processor circuit, wherein the memory comprises computer program instructions that, when executed by the processor circuit cause the apparatus to obtain a list that comprises one or more events textually describing an activity of the computer system being tested. The apparatus is further caused to select a group of events in the list, wherein the group of events is indicative of a failed test of the computer system. The apparatus is further caused to extract textual features from the selected group of events. The apparatus is further caused to generate a feature vector comprising the extracted textual features. The apparatus is further caused to map the feature vector to a plurality of predefined troubleshooting activities. The apparatus is further caused to select one or more of the plurality of predefined troubleshooting activities for execution in response to the mapping of the feature vector.

In accordance with a fourth aspect of the present invention, there is provided an apparatus for troubleshooting a computer system. The apparatus is configured to obtain a list that comprises one or more events textually describing an activity of the computer system being tested. The apparatus is further configured to select a group of events in the list, wherein the group of events is indicative of a failed test of the computer system. The apparatus is further configured to extract textual features from the selected group of events. The apparatus is further configured to generate a feature vector comprising the extracted textual features. The apparatus is further configured to map the feature vector to a plurality of predefined troubleshooting activities. The apparatus is further configured to select one or more of the plurality of predefined troubleshooting activities for execution in response to the mapping of the feature vector.

At least some embodiments of the present invention advantageously enable automatic suggestion or selection of a proper troubleshooting activity for the failed test case. The list of events or log files used by the embodiments do not need to be written in a formal language. In case of the systems employing unsupervised learning techniques The embodiments of the invention allow collection of data from previous experience. This enables a higher classification accuracy compared to unsupervised learning methods which aim to find unknown patterns in data, leading to worse accuracy. The embodiments aim to map a proper troubleshooting activity to a failed log, and thus it is more important to find the correct class rather than all existing unknown classes. In unsupervised learning, the spectral classes do not always correspond to informational classes. The spectral properties of each class can easily change over time so the testers cannot have the same troubleshooting class while moving from one log to another. Through the use of predefined troubleshooting classes/supervised learning, the testers do not need to spend time interpreting the troubleshooting classes generated by some previously used models. Some embodiments allow larger word embeddings to be learned (having more dimensions) from much larger corpora of a log file. The embodiments further enable eliminating some of the irrelevant information and manual work associated with software testing. For each failed test case, the embodiments provide one to one and one-to-many troubleshooting activities mapping. In some embodiments, the test case may be automatically updated based on the output of the system. One such a case is automatic clean-up of test case code.

BRIEF DESCRIPTION OF THE DRAWINGS

FIG. 5 illustrates a sample of a log for use by some of the embodiments.

FIG. 8 illustrates a sample of a group of events obtained according to some of the embodiments.

FIG. 9 illustrates an architectural diagram illustrating operations of systems/methods according to some embodiments.

FIG. 10 illustrates a sample of word embeddings obtained according to some of the embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Embodiments described herein provide apparatuses/methods for troubleshooting computing systems, such as network nodes e.g. base stations, mobile devices e.g. UEs.

Figures 1, 2:
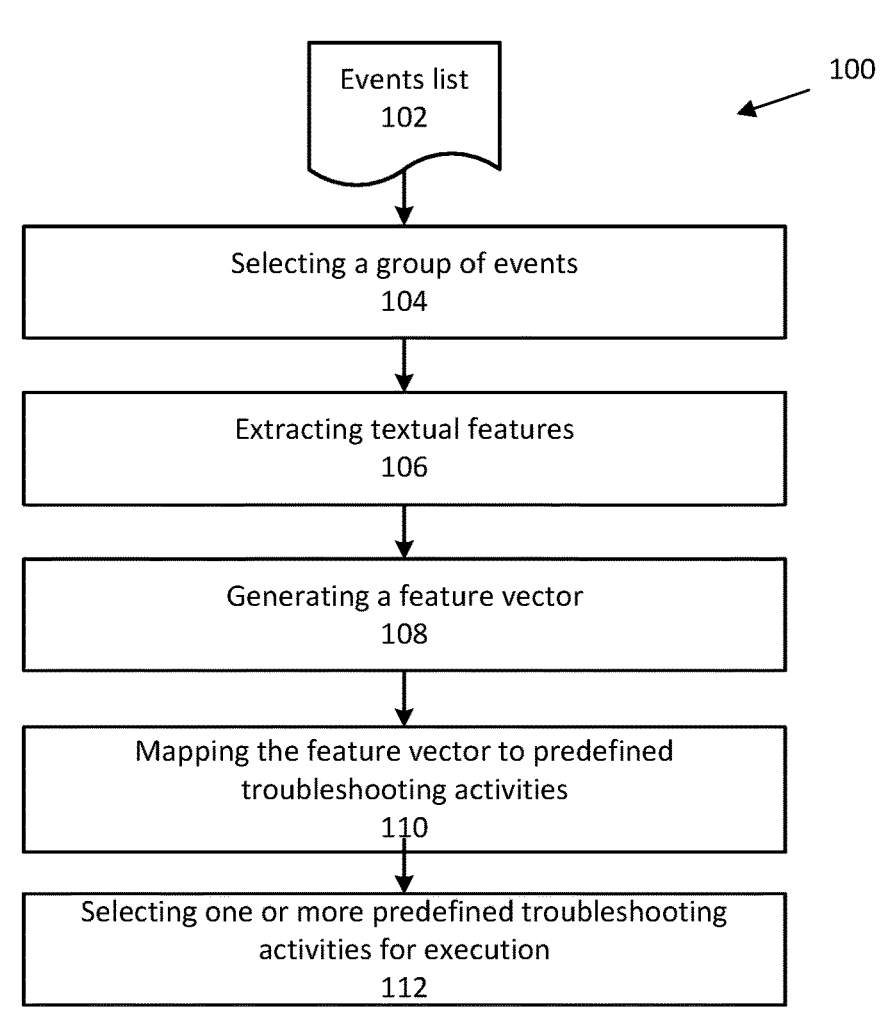
FIG. 1 illustrates a simplified wireless communication system.
FIGS. 2 to 4 are flowcharts of operations of systems/methods of troubleshooting a computer system according to some embodiments.

FIG. 1 is a flowchart illustrating operations of a method 100 of troubleshooting a computing system. The method 100 may be performed by an apparatus 700. At step 102, the method comprises obtaining a list that comprises one or more events textually describing an activity of the computer system being tested. The list may comprise a log file which records either events that occur in a system or other software run. The list may further comprise a Continuous Integration/Continuous Delivery, CI/CD flow execution log files. In particular, the list may itself by very large and contain a variety of information. The list may be in textual form and may be written in natural language, such as English. Furthermore, the list may further be stored in different formats, such as JavaScript Object Notation, JSON, or JUnit Common Auto Tester, JCAT.

FIG. 5 illustrates a sample of a raw log file before any processing is applied. Each line in the log file may represent a particular event in the system. The events may represent an activity of the computing system, such as its operational state, action undertaken, start of action, end of action, result of action and other operational parameters. The event may comprise a plurality of fields where each respective field may store different information. For example, the event illustrated in the FIG. 5 comprises the following fields: date, event type, module name, submodule, process ID, event message, test result. The fields in the event may be separated from each other using a predefined character, such as white space. The events in the list may also be arranged in a chronological order. The list may be generated by different computing systems, such as network nodes, platforms, applications and may be obtained by, for example, by receiving a log file from the computing system. The list may also be obtained directly from the device on which the method is performed, which may be the computing system under test. In such a case, the list may be a log file stored in a local storage, such as a memory.

Figure 3:
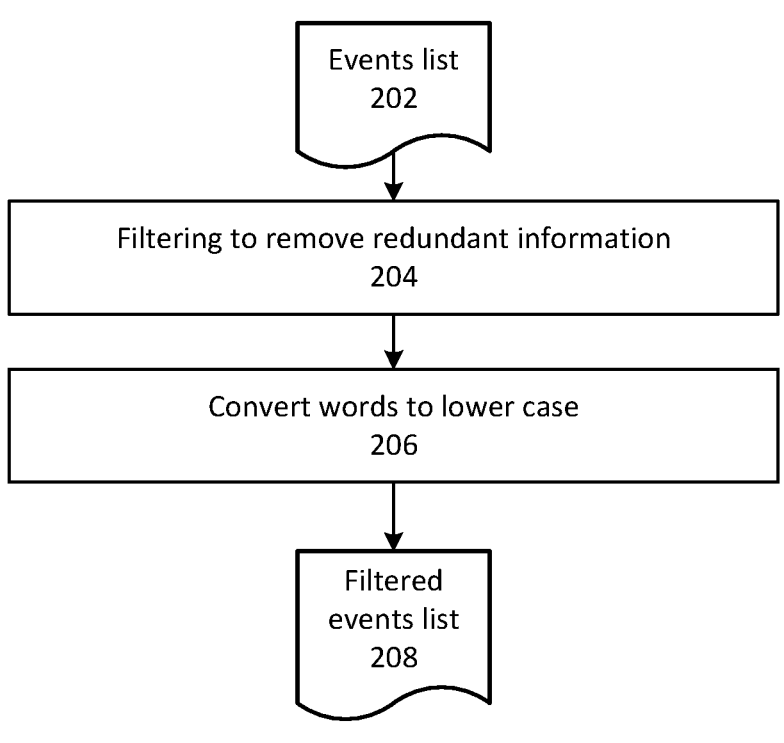
Figure 4:
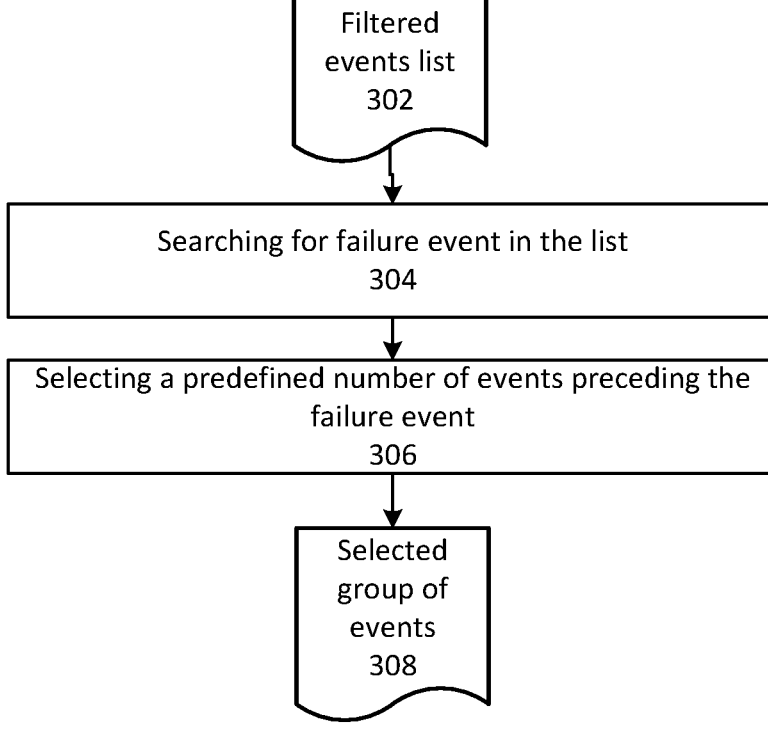
Figure 6:
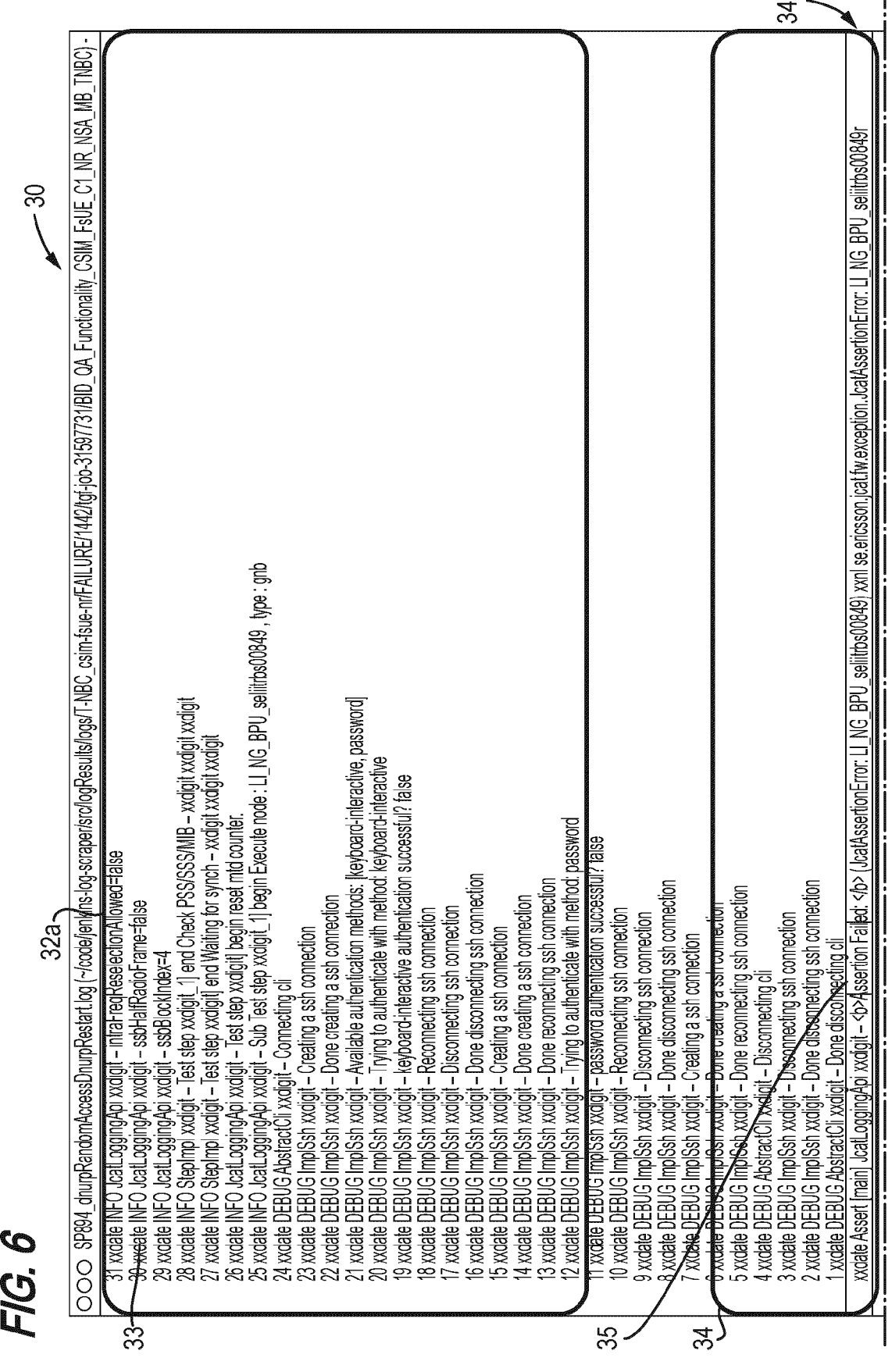
FIG. 6 illustrates a sample of a pre-processed log file according to some of the embodiments.

FIG. 3 illustrates data pre-processing steps that may be performed in some embodiments to produce a filtered events list 208. The list of events 202 may be filtered, at step 204, to remove and/or replace redundant information 32a, 32b and to obtain a pre-processed log file 30 (FIG. 6). Some information in the log file may need to be removed entirely or replaced with one or more predefined tags. For example, the timestamp or date field in each event in the list may be replaced with a "xxdate" tag 33, file locations with "xxfile" tag, Internet Protocol, IP addresses with "xxip" tag, memory addresses with "xxmem". Furthermore, duplicate rows and/or citation marks may be removed from the log. Information important and relevant to subsequent processing may be retained in the log, such as event fields corresponding to one or more of: location, software version, event type, date, priority, function, event message, status, uniform resource locator, URL. When the event is associated with specific test case being executed in the computing system, the events containing the event type value of "assert" and event message "assertion failed" and/or a word "fail" are also retained in the pre-processed log. At step 206, the words in the log file may be converted into lower case.

At step 104, the method comprises selecting a group 34, 308 of events in the list, wherein the group 34, 308 of events is indicative of a failed test of the computer system. The text of the filtered or pre-processed list 302 of events or the raw log file 102 directly may then be searched to identify a word descriptive of the failed test. For example, said word or phrase may comprise "assertion failure" Once the word 35 is identified, a failure event 34a comprising said word is selected. In particular, the error messages in the event containing said word are extracted through capturing the information from the line or event where "assertion failure" phrase appears. At step 306, when the events in the log 30 are arranged in a chronological order, the method comprises selecting a predefined number of events directly preceding the failure event 34a. In particular, five events directly preceding the failure event 34a may be selected. Thereby, the failure event 34a together with the predefined number of preceding events is selected to form the group 34, 308 of events. Later, all the subsequent processing may be performed on the group 34, 308 of events rather than on one failure event 34a. Forming the group 34, 308 of events advantageously decreases the risk of losing any relevant information that might be useful for troubleshooting or root cause analysis. It further allows a decrease of the size of the log file which needs to be later processed for troubleshooting. This further reduces the required time for mapping the failed test case to a proper troubleshooting activity. Steps 205, 206, 304, 306 may be performed using a suitable text parsing script, module or function. FIG. 8 illustrates an example of group 40 of events where the log events are concatenated in the inverse order. As the last line in the group of events is always the event containing "assertion failure" which provides the most general context, arranging the log events in an inverse order helps to have the most important information processed first.

At step 106, the method comprises extracting textual features from the selected group 34, 40, 308 of events. In particular, the text encompassed in the group 34, 40, 308 of the group may be tokenized by splitting into a character separating the words, such as a white space. Thereby each word may be separated and subsequently processed, for example to generate, at step 108, a feature vector comprising the extracted textual features. In particular, the tokenized text of the group 34, 40, 308 of events may then be processed to generate word embeddings. Word embeddings are a set of language modelling and feature learning techniques in natural language processing, NLP where words or phrases from the vocabulary or text are mapped to vectors of real numbers. In particular, word embeddings involve a mathematical embedding from a space with many dimensions per word to a continuous vector space with a lower dimension.

Figure 7:
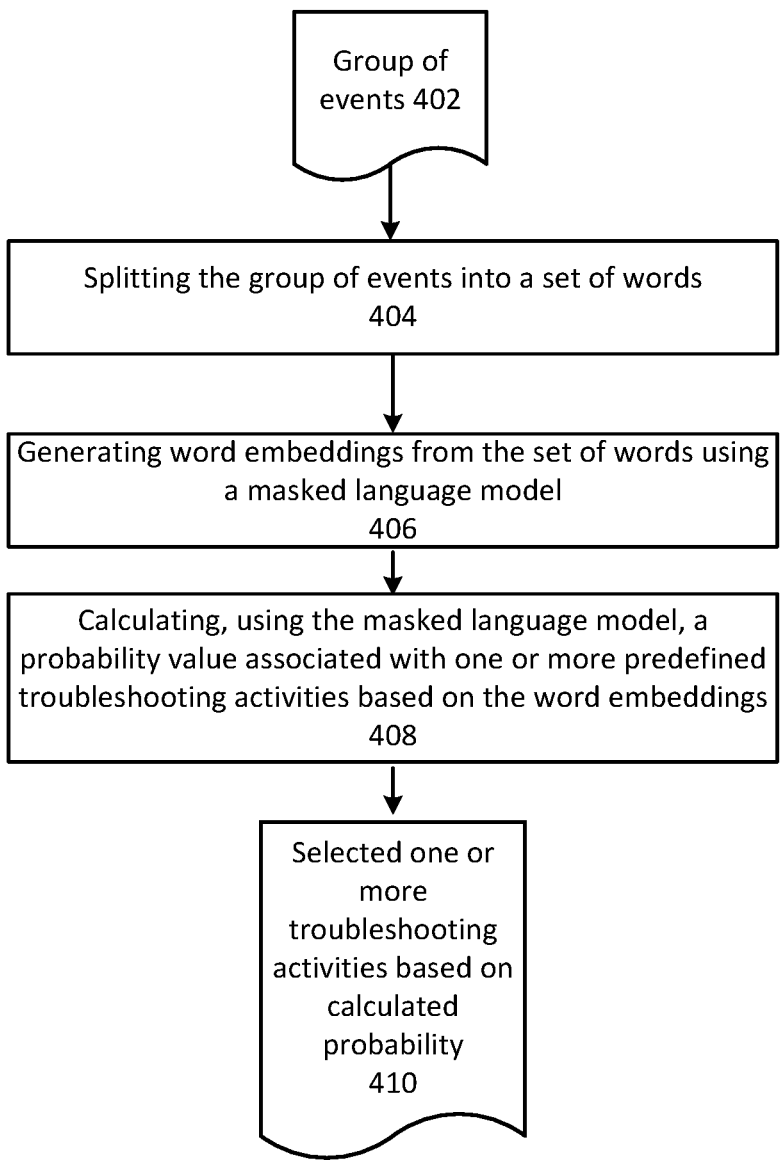
FIG. 7 illustrates a flowchart of operations of systems/methods of troubleshooting a computer system according to some embodiments.

FIG. 7, 8, 9 illustrate one embodiment, where the group 34, 40, 308, 402 of events are split into a set of words; and wherein generating the feature vector comprises generating 406 word embeddings 60 from the set of words using a masked language model 50. The masked language model may comprise a Distilled Bidirectional Encoder Representations from Transformers, DistilBERT-based machine learning function. FIG. 8 represents an example input group 40, 402 of events that may be provided to the DistilBERT model 50. The model 50 extracts the failure message 51 where each word of the message is tokenized and processed separately. A word is then chosen to substitute with a Masked Language Modelling, [MASK] token. The token may be used to perform a type of a fill-in-the-blank task, wherein the DistilBERT model 50 uses the context words surrounding the [MASK] token to try to predict what the [MASK] word should be. In the example of FIG. 9, the masked word is the word "enable". The model 50 then will use the other words such as "failed", "to", "the", "enb", "cell" to predict that the [MASK] token 52 should be the word "enable". When using the model 50 as pre-trained DistilBERT model 50, 15% of the tokens are randomly masked using the [MASK] token. The tokens and the masked tokens are then fed to the Bidirectional Encoder Representations from Transformers, BERT-based neural network 53 which is a core component of DistilBERT model. Based on its input, the BERT network 53 generates word embeddings 60. The DistilBERT model has 40% fewer parameters than other models and runs 60% faster.

The generated feature vector 60 is then mapped, at step 110, to a one or more of predefined troubleshooting activities which may be then selected, at step 112, for execution. In some embodiments, execution of the selected one or more troubleshooting activities may be initiated, wherein the one or more of the plurality of troubleshooting activities comprises an instruction or a command directed at resolving a root cause of the failed test in the computing system. In particular, the selected class or troubleshooting activity may be automatically executed using a suitable execution function when triggered by a failed or unstable log message. It will advantageously reduce fault resolution lead time where the prompt response is highly demanded, for example in the context of remote network nodes where it is costly to dispatch a field technician to fix the technical issue. As soon as a course of action has been determined by the method or apparatus according to the embodiments, for example performance of a troubleshooting activity according to the "Class 5", then an application programming interface, API may be called to connect to the target computing system, such as a network node to execute a sequence of commands. A set of environmental parameters, such as node connection, authentication details may be passed by the same API to facilitate troubleshooting. Thereby, the need for repetitive manual troubleshooting reduces significantly.

In the embodiment of FIG. 9, the generated word embeddings 60 are provided to a feedforward neural network, FFNN which uses SOFTMAX activation function in its output layer. The FFNN together with SOFTMAX function work as a classifier and calculate 408 a respective probability value associated with one or more of the plurality of predefined troubleshooting activities based on the word embeddings. Selecting the one or more of the plurality of predefined troubleshooting activities is based on the calculated probability values. The SOFTMAX function is a function that turns a vector of K real values into a vector 55 of K real values that sum to 1 (not shown in FIG. 9). The SOFTMAX transforms them into values between 0 and 1, so that they can be interpreted as probabilities. The DistilBERT model 50 is further described in Sanh, V., Debut, L., Chaumond, J. and Wolf, T., 2019. DistilBERT, a distilled version of BERT: smaller, faster, cheaper and lighter. arXiv preprint arXiv:1910.01108.

In the example of FIG. 9, the troubleshooting activity illustrated by "Class 1" has a probability of 0.1%, whereas a troubleshooting activity illustrated by "Class 5" has a probability of 75%. It therefore follows that the "Class 5" troubleshooting activity 410 may be selected as the most appropriate for the given input of group of events 402. In one example, "Class 5" may indicate that previous test case clean-up was not completed correctly. The identified troubleshooting activity in this case means that the troubleshooter needs to update the test case code to handle the clean-up of the code, based on an error log from Mobility Management Entity, MME, International Mobile Subscriber Identity, IMSI range, etc.

Figure 11:
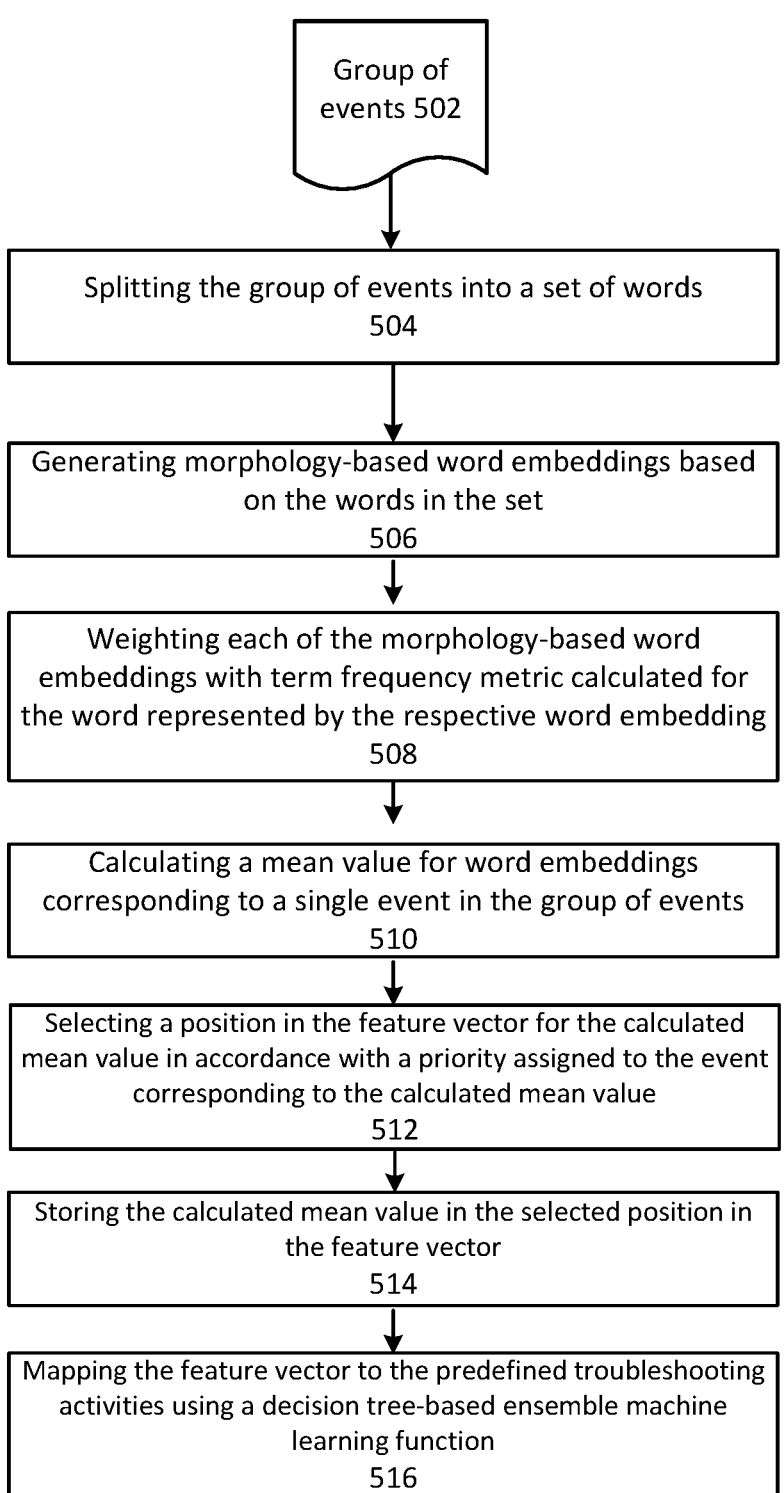
FIG. 11 illustrates a flowchart of operations of systems/methods of troubleshooting a computer system according to some embodiments.
Figure 12:
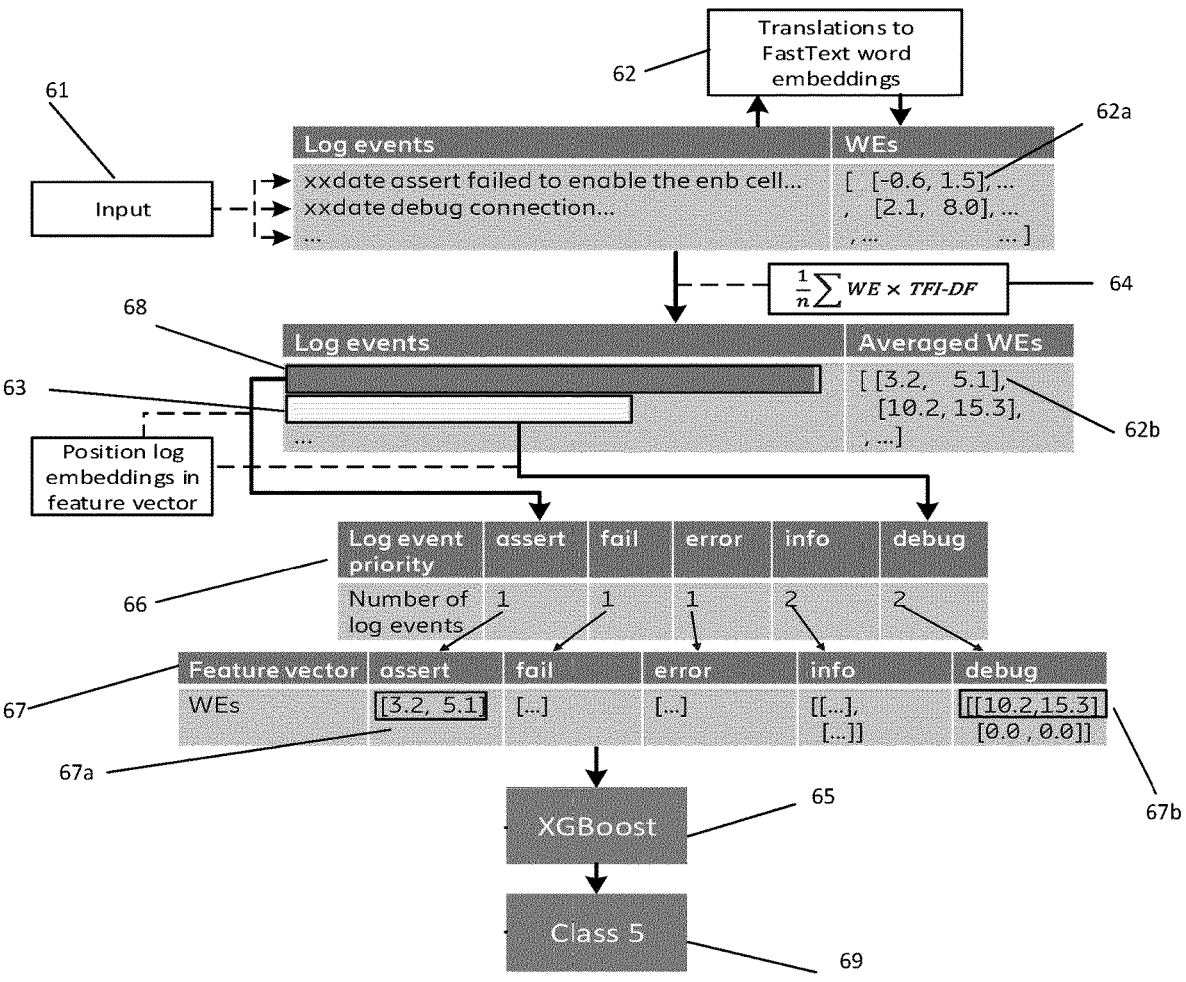
FIG. 12 illustrates a block diagram illustrating a generation of feature vector according to some embodiments.

FIGS. 11 and 12 illustrate alternative embodiment. The group 502 of events are split, at step 504, into a set of words, for example by tokenizing them using a suitable tokenizer. The set of words is then fed to a morphology-based word embedding function which generates, at step 506, morphology-based word embeddings. Step 504 and 506 may be performed using for example FastText Word2Vec-based neural network model. FastText word embeddings are based on the skip-gram model, where each word is represented as a bag of character n-grams. A vector representation is associated with each character n-gram, where words are represented as the sum of these representations. This extends the word2vec-type models with subword information and helps the word embeddings understand suffixes and prefixes. Once a word is represented using character n-grams, a skip-gram model is trained to learn the embeddings. FastText model can handle out-of-vocabulary words better and faster.

FIG. 12 illustrates generating the feature vector in an embodiment utilising a decision tree-based ensemble machine learning function, such as an Extreme Gradient Boosting, XGBOOST machine learning function. The group

61, 502 of events may be provided to the FastText word embeddings function 62 that generates the morphology-based word embeddings based on the words in the group 61, 502 of events. At step 508, the morphology-based word embeddings 62a are weighted 64 with a respective term frequency metric calculated for the word represented by the respective morphology-based word-embedding 63. In particular, the word embeddings for each log event may be multiplied by the corresponding Term Frequency-Inverse Document Frequency, TF-IDF weight. TF-IDF is a numerical statistic that is used to reflect how important a word is to a document in a collection or corpus. TF-IDF. The TF-IDF value increases proportionally to the number of times a word appears in the document and is offset by the number of documents in the corpus that contain the word, which helps to adjust for the fact that some words appear more frequently in general. At step 510, a mean value 62b is calculated for word embeddings corresponding to a single event in the group 61, 502 of events. At step 512, a position is selected in the feature vector 67 for the calculated mean value in accordance with a priority assigned to the event corresponding to the calculated mean value. The priority may be decided using a table 66 where event types of "assert" or "fail" or "error" receive a higher priority, whereas, event types of "info" or "debug" receive a lower priority. At step 514, the calculated mean value is stored in the selected position in the feature vector. For example, the table 66 indicates that word embeddings corresponding to log events comprising an event type of either "assert" or "fail" or "error" should be positioned in the feature vector 67 before the other word embeddings corresponding to event types of "info" or "debug". This aids in a situation when the training was performed on data or log files where the log events appear in a different order compared to new data or logs that we want to perform inference on. If the log event of a certain priority is not present in the group of events, then a corresponding position in the feature vector 67 is filled with 0s. The table 66 also indicates a number of log events in the group of events, wherein the number indicates how many events of a particular type are comprised in the group of events. For example, in the resulting feature vector 67, the first position 67a stores a mean of word embeddings corresponding to the log event 68 of the type "assert". The fifth position 67b in the vector 67 stores means of word embeddings corresponding to the "debug" log event 63 type. Since there are two log events of the type "debug" in the group of events, there are two word embedding means stored in this position, each corresponding to respective log event. At step 516, the feature vector 67 is mapped to the predefined troubleshooting activities using a decision tree-based ensemble machine learning function, such as XGBOOST model 65. The model 65 subsequently classifies the feature vector 67 into one or more classes 69.

Figure 13:
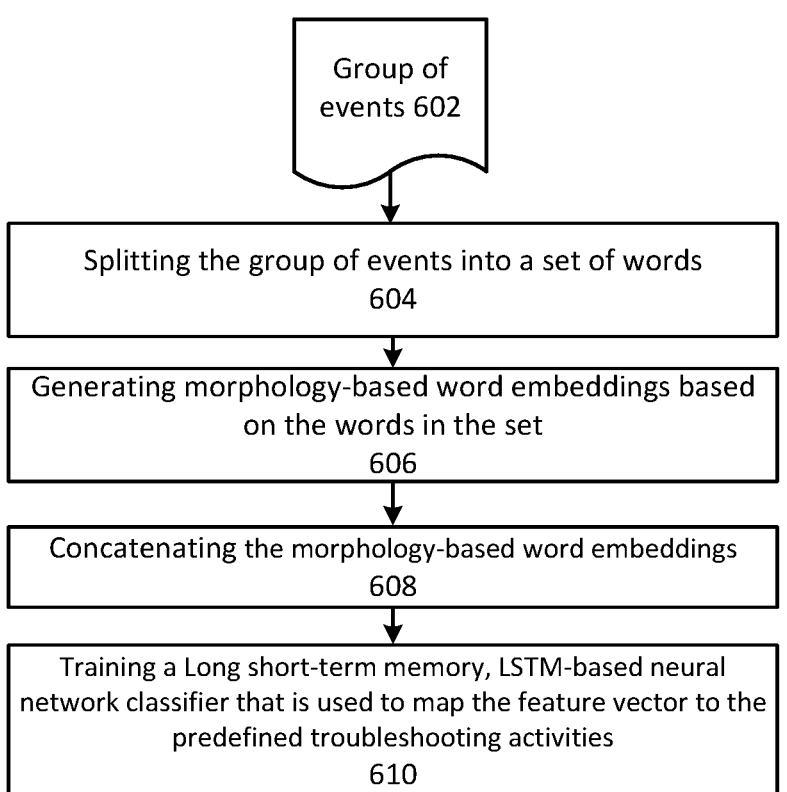
FIG. 13 illustrates a flowchart of operations of systems/methods of troubleshooting a computer system according to some embodiments.
Figure 14:
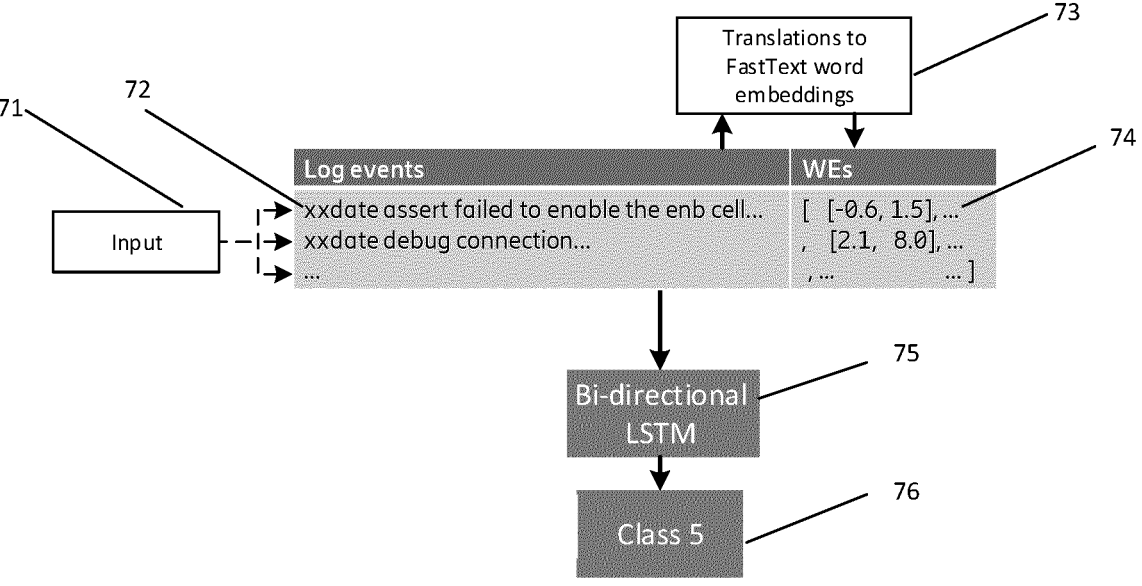
FIG. 14 illustrates a block diagram illustrating operations of systems/methods according to some embodiments.
Figure 15:
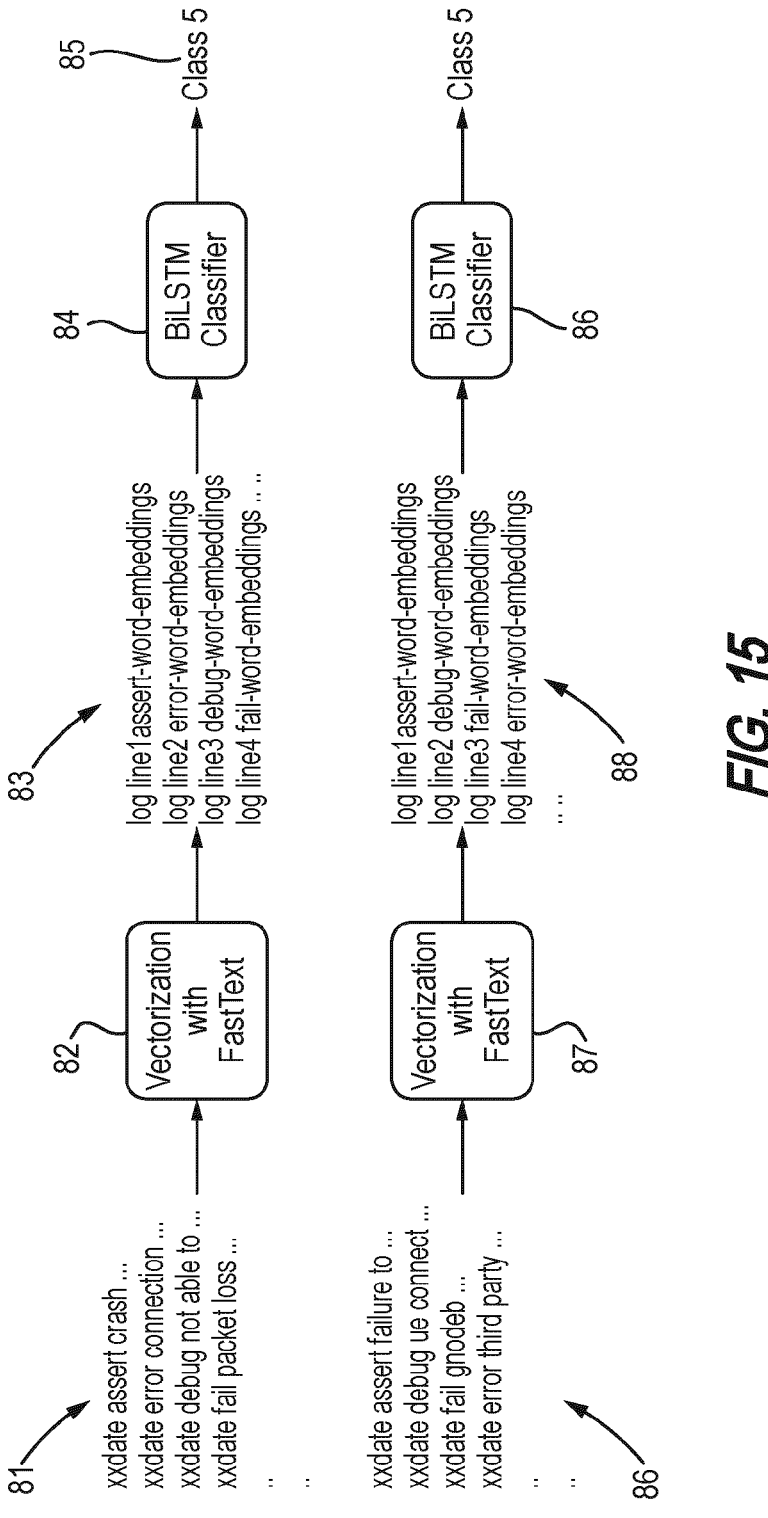
FIG. 15 illustrates a flow diagram of a processing of group of events according to some embodiments.

FIGS. 13, 14 and 15 illustrate an embodiment utilising a Long short-term memory, LSTM-based neural network classifier. The LSTM may comprise a cell which is a memory part, and three regulators or gates that regulate the flow of information inside the LSTM unit: an input gate, an output gate and a forget gate. The cell is responsible for keeping track of the dependencies between the elements in the input sequence. The input gate controls the extent to which a new value flows into the cell, the forget gate controls the extent to which a value remains in the cell and the output gate controls the extent to which the value in the cell is used to compute the output activation of the LSTM unit. The activation function of the LSTM gates may be a logistic sigmoid function. There are connections into and out of the LSTM gates, a few of which are recurrent. The weights of these connections, which need to be learned during training, determine how the gates operate.

The input 71 in this embodiment is the group of events 602 as described previously. At step 604, the group of events 602 is split into a set of words. At step 606, morphology-based word embeddings are generated based on the words in the set, for example using FastText word embeddings function 73. Steps 604 and 606 are the same for both embodiments involving XGBOOST and LSTM. At step 608, the generated morphology-based word embeddings are concatenated. The concatenated word embeddings 74 are provided for training, at step 610, the Bi-directional LSTM neural network classifier, BiLSTM 75 that is then used to map the feature vector 74 to the predefined troubleshooting activities 76. FIG. 15 illustrates the flows of data for two different groups of events. The group 81 of events contains at least four log events of the types "assert", "error", "debug" and "fail". The group 81 is then vectorised using FastText word embeddings function 82 to generate a feature vector 83 comprising the word embeddings. The word embeddings are then concatenated and provided as input to BiLSTM 84. In the BiLSTM, the learning algorithm is fed with the original data once from beginning to the end and once from end to beginning. The BiLSTM 84 maps the provided word embeddings to one or more predefined troubleshooting activities. Reference numerals 87 and 89 correspond to reference numerals 82 and 84, respectively. The group of events 86 follows a similar process as described above.

The embodiments have been trained on the training set comprising 767 unique failed test case executions. A total of 2368 groups of log events were captured using a failure identifier which were labelled by subject-matter expert for mapping the proper troubleshooting activities. Table 2 lists the troubleshooting activities which are divided into 16 classes. Some classes, such as "class 14=Authentication failed (Environment issue)" describe a generic activity, whereas other classes provide a detailed solution for the troubleshooting activity, for example "class 5=Previous test case clean-up not done correctly".

TABLE 2

| Troubleshooting activities divided into 16 classes | |
| --- | --- |
| Class | Troubleshooting activity |
| 1 | Evolved NodeB, eNodeB Cell lock/Unlock operation |
| 2 | Packet loss for Uplink/Downlink |
| 3 | UE power off/on failure |
| 4 | timeout on Multi-Standard UE, MSUE event |
| 5 | Previous test case clean-up not done correctly |
| 6 | test case fault + unidentified fault |
| 7 | Layer-1BP, L1BP Interface Lock/Unlock |
| 8 | UE Attach failure |
| 9 | 5th Generation NodeB, gNodeB Cell lock/Unlock operation |
| 10 | dedicated New Radio UE Radio Processing, dNURP Cell lock/unlock operation |
| 11 | TermPointTo xNodeb not enabled |
| 12 | gNodeB SectorCarrier failed |
| 13 | PLT subtest failure |
| 14 | Authentication failed (Environment issue) |
| 15 | Failed to create Access and Mobility Management Function, AMF |
| 16 | Cells not available in Core Simulated, csim |
| −1 | Unknown |

The performance of all described embodiments is measured against a ground truth as described above. The class "−1" represents relabeled datapoints for all classes except class 1, 2, 3 and 11. This is performed to better represent a real-world scenario, and also to reduce misclassification.

Table 3 summarizes the performance results for an embodiment using DistilBERT model.

TABLE 3

| Performance measurements of DistilBERT embodiment. | | | | |
| --- | --- | --- | --- | --- |
| Class | Precision | Recall | F1 score | Support |
| 1 | 1 | 0.89 | 0.94 | 27 |
| 2 | 0.99 | 1 | 1 | 113 |
| 3 | 0.86 | 0.95 | 1 | 27 |
| 11 | 0.90 | 1 | 0.95 | 19 |
| −1 | 0.93 | 0.76 | 0.84 | 37 |
| Accuracy | — | — | 0.94 | 258 |
| Macro average | 0.94 | 0.92 | 0.92 | 258 |
| Weighted average | 0.94 | 0.94 | 0.94 | 258 |

Table 4 summarizes the performance results for an embodiment combining the Word2vec model for word embedding and XGBOOST model for the classification.

TABLE 4

| Performance measurements for combined Word2Vec and XGBOOST embodiment. | | | | |
| --- | --- | --- | --- | --- |
| Class | Precision | Recall | F1 score | Support |
| 1 | 0.88 | 0.93 | 0.90 | 15 |
| 2 | 0.77 | 1 | 0.87 | 55 |
| 3 | 0.81 | 0.42 | 0.56 | 40 |
| 11 | 0.94 | 1 | 0.97 | 16 |
| −1 | 0.60 | 0.63 | 0.62 | 19 |
| Accuracy | — | — | 0.79 | 145 |
| Macro average | 0.80 | 0.80 | 0.78 | 145 |
| Weighted average | 0.79 | 0.79 | 0.77 | 145 |

Table 5 summarizes the performance results for an embodiment combining the Word2vec model for word embedding and LSTM model for the classification.

TABLE 5

| Performance measurements for combined Word2Vec and LSTM embodiment. | | | | |
| --- | --- | --- | --- | --- |
| Class | Precision | Recall | F1 score | Support |
| 1 | 0.96 | 0.92 | 0.94 | 26 |
| 2 | 0.85 | 0.61 | 0.71 | 103 |
| 3 | 0.52 | 0.82 | 0.64 | 67 |
| 11 | 0.96 | 1 | 0.98 | 26 |
| −1 | 0.67 | 0.5 | 0.57 | 147 |
| Accuracy | — | — | 0.98 | 258 |
| Macro average | 0.98 | 0.97 | 0.97 | 258 |
| Weighted average | 0.98 | 0.98 | 0.98 | 258 |

Figure 16:
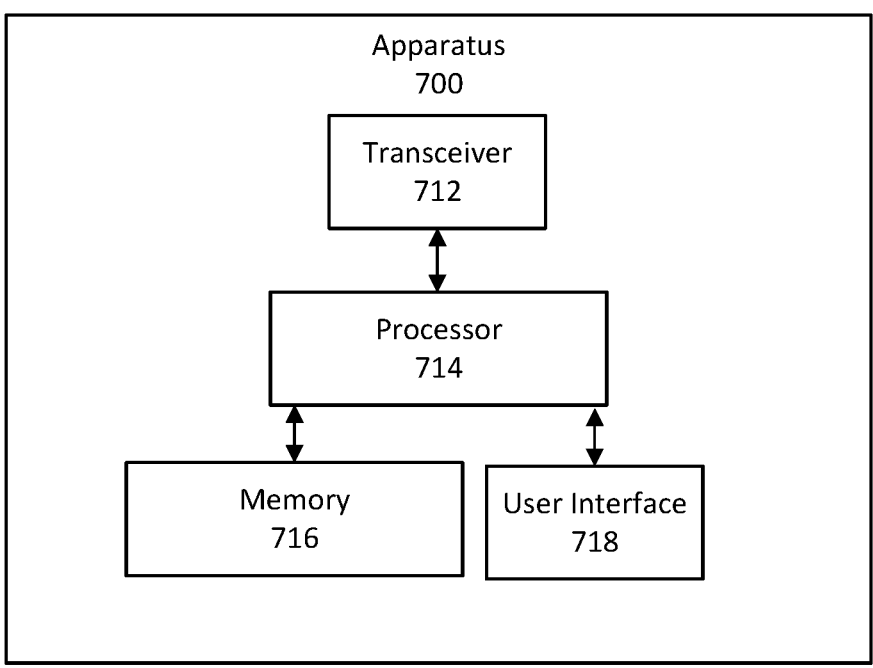
FIG. 16 is a block diagram of an apparatus for troubleshooting a computer system according to some embodiments.

FIG. 16 depicts an example of an apparatus 700 for troubleshooting a computer system according to some embodiments. The apparatus may act as a decision support system. As shown, the apparatus 700 may include a transceiver circuit 712 (also referred to as a transceiver) including a transmitter and a receiver configured to provide uplink and downlink communications with communication devices. The apparatus 700 may also include a processor circuit 714 (also referred to as a processor) coupled to the transceiver circuit 712, and a memory circuit 716 (also referred to as memory) coupled to the processor circuit 714. The memory circuit 716 may include computer readable program code that when executed by the processor circuit 714 causes the processor circuit to perform operations according to embodiments disclosed herein. The computer program code may comprise a Python code, for example. According to other embodiments, processor circuit 714 may be defined to include memory so that a separate memory circuit is not required. The apparatus 700 may further include a user interface 718 to allow interactions between the apparatus and a human operator.

As discussed herein, operations of the apparatus 700 may be performed by processor 714. Moreover, modules may be stored in memory 716, and these modules may provide instructions so that when instructions of a module are executed by processor 714, processor 714 performs respective operations (e.g., operations discussed above with respect to example embodiments).

Accordingly, an apparatus 700 according to some embodiments includes a processor circuit 714, a transceiver 712 coupled to the processor circuit, and a memory 716 coupled to the processor circuit, the memory including machine readable program instructions that, when executed by the processor circuit, cause the apparatus 700 to perform operations described above.

Figure 17:
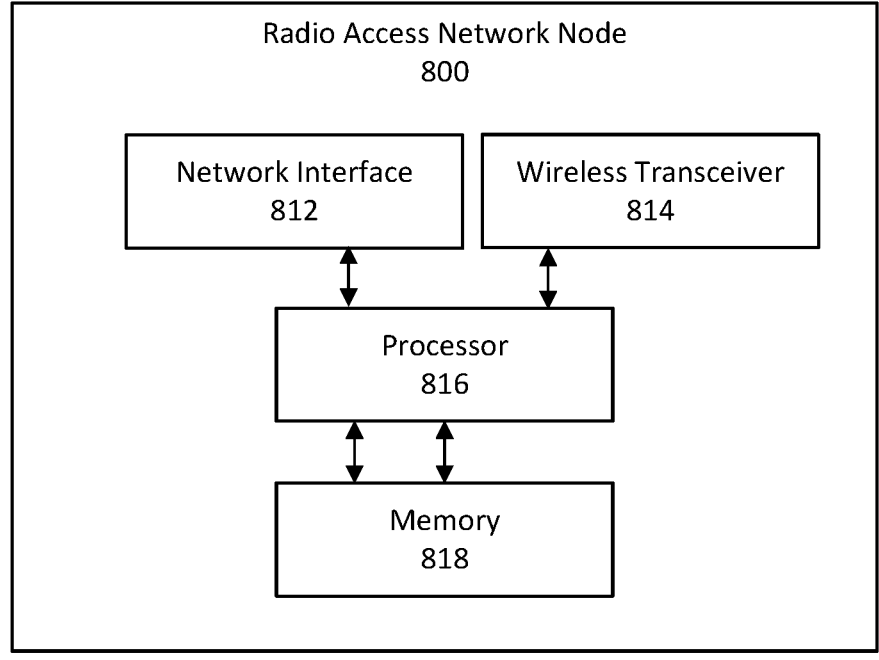
FIG. 17 is a block diagram of a radio access network node according to some embodiments.

FIG. 17 depicts a network node, such as a radio access network node 800 that may be a computing system 800 on which troubleshooting is performed. The node 800 may be configured to function within a radio access network, RAN to provide connectivity to communication devices such as UEs. The network node 800 may include a network interface circuit 812 (also referred to as a network interface) configured to provide communications with other nodes (e.g., with other base stations and/or core network nodes) of the wireless communication network. The network node 800 may further include a wireless transceiver 814 for performing wireless communications with a communication device. The memory circuit 818 may include computer readable program code that when executed by the processor circuit 816 causes the processor circuit to perform various operations. The example operations include the operations necessary to provide connectivity within a network or to handle network traffic. Alternatively or additionally, the operations may include operations according to the embodiments, such as steps of the method 100. According to other embodiments, processor circuit 816 may be defined to include memory so that a separate memory circuit is not required. The network node 800 may communicate or provide, using e.g. the wireless transceiver 814, log files from the tests being performed on the network node to the apparatus 700.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof.

Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows. Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of troubleshooting a computer system, the method comprising:

obtaining a list that comprises one or more events textually describing an activity of the computer system being tested;

selecting a group of events in the list, wherein the group of events is indicative of a failed test of the computer system;

extracting textual features from the selected group of events;

generating a feature vector comprising the extracted textual features, wherein generating the feature vector comprises generating word embeddings from the set of words using a masked language model or a neural network model, wherein the masked language model or the neural network model is trained on a plurality of events in the list textually describing the activity of the computer system being tested to capture contextual relationships between words in the textually described activity;

mapping the feature vector to a plurality of predefined troubleshooting activities;

automatically selecting one or more of the plurality of predefined troubleshooting activities for execution in response to the mapping of the feature vector; and automatically initiating execution of the automatically selected one or more of the plurality of predefined troubleshooting activities, wherein the initiating execution comprises issuing one or more commands that modify a configuration or operational state of the computer system.

2. The method of claim 1, wherein the one or more textually described events are written in a natural language.

3. The method of claim 1, wherein the one or more of the plurality of troubleshooting activities comprises an instruction or a command directed at resolving a root cause of the failed test.

4. The method of claim 1, further comprising:

filtering the list by retaining information corresponding to one or more of: location, software version, event type, date, priority, function, event message, status, uniform resource locator, URL, wherein other information in the list is removed or replaced with one or more predefined tags.

5. The method of claim 1, wherein automatically selecting the group of events in the list comprises searching the list for a word descriptive of the failed test and selecting a failure event comprising said word.

6. The method of claim 5, wherein the events in the list are arranged in a chronological order and selecting the group of events in the list further comprises selecting a predefined number of events directly preceding the failure event.

7. The method of claim 1, wherein extracting the textual features comprises:

splitting the group of events into a set of words.

8. The method of claim 7, wherein mapping the feature vector to the plurality of predefined troubleshooting activities comprises:

calculating, using the masked language model, a respective probability value associated with one or more of the plurality of predefined troubleshooting activities based on the word embeddings, and wherein selecting the one or more of the plurality of predefined troubleshooting activities is based on the calculated probability value.

9. The method of claim 8, wherein the masked language model is a Distilled Bidirectional Encoder Representations from Transformers, DistilBERT-based machine learning function.

10. The method of claim 1, wherein extracting the textual features comprises:

splitting the group of events into a set of words; and wherein the generating word embeddings from the set of words comprises generating morphology-based word embeddings based on the words in the set.

11. The method of claim 10, wherein generating the feature vector comprises:

weighting the morphology-based word embeddings with a respective term frequency metric calculated for the word represented by the respective morphology-based word-embedding;

calculating a mean value for word embeddings corresponding to a single event in the group of events;

selecting a position in the feature vector for the calculated mean value in accordance with a priority assigned to the event corresponding to the calculated mean value;

storing the calculated mean value in the selected position in the feature vector.

12. The method of claim 10, wherein splitting the group of events and generating the morphology-based word embeddings is performed using FastText Word2Vec-based neural network model.

13. The method of claim 10, wherein mapping of the feature vector to the plurality of predefined troubleshooting activities is performed using a decision tree-based ensemble machine learning function.

14. The method of claim 13, wherein the decision tree-based ensemble machine learning function comprises an Extreme Gradient Boosting, XGBoost-based machine learning function.

15. The method of claim 10, wherein generating the feature vector comprises concatenating the morphology-based word embeddings and wherein the method further comprises training a Long short-term memory, LSTM-based neural network classifier that is used to map the feature vector to the plurality of predefined troubleshooting activities.

16. The method according to claim 1, wherein the computer system comprises a network node in a communication network.

17. A computer program product comprising a computer readable medium, the computer readable medium having computer readable code embodied therein, the computer readable code being configured such that, on execution by a suitable computer or processor, the computer or processor is caused to perform a method as claimed in claim 1.

18. An apparatus for troubleshooting a computer system, the apparatus comprising a processor circuit and a memory coupled to the processor circuit, wherein the memory comprises computer program instructions that, when executed by the processor circuit cause the apparatus to:

obtain a list that comprises one or more events textually describing an activity of the computer system being tested;

select a group of events in the list, wherein the group of events is indicative of a failed test of the computer system;

extract textual features from the selected group of events;

generate a feature vector comprising the extracted textual features, wherein generating the feature vector comprises generating word embeddings from the set of words using a masked language model or a neural network model, wherein the masked language model or the neural network model is trained on a plurality of events in the list textually describing the activity of the computer system being tested to capture contextual relationships between words in the textually described activity;

map the feature vector to a plurality of predefined troubleshooting activities;

automatically select one or more of the plurality of predefined troubleshooting activities for execution in response to the mapping of the feature vector; and automatically initiate execution of the automatically selected one or more of the plurality of predefined troubleshooting activities, wherein the initiating execution comprises issuing one or more commands that modify a configuration or operational state of the computer system.

19. The apparatus of claim 18, wherein mapping the feature vector to the plurality of predefined troubleshooting activities comprises:

calculating, using the masked language model, a respective probability value associated with one or more of the plurality of predefined troubleshooting activities based on the word embeddings, and wherein selecting the one or more of the plurality of predefined troubleshooting activities is based on the calculated probability value, wherein the masked language model is a Distilled Bidirectional Encoder Representations from Transformers, DistilBERT-based machine learning function.

20. The apparatus of claim 18, wherein extracting the textual features comprises:

splitting the group of events into a set of words; and wherein the generating word embeddings from the set of words comprises generating morphology-based word embeddings based on the words in the set, wherein splitting the group of events and generating the morphology-based word embeddings is performed using FastText Word2Vec-based neural network model.

* * * * *